United States Patent
Seo et al.

(10) Patent No.: US 9,225,374 B2
(45) Date of Patent: Dec. 29, 2015

(54) MOBILE DEVICE HAVING SIM CARD, BASE STATION CONNECTED THERETO, AND BATTERY MANAGEMENT METHOD THEREOF

(71) Applicant: Samsung Electronics Co., Ltd., Suwon-si, Gyeonggi-do (KR)

(72) Inventors: Jeongseok Seo, Seoul (KR); Yihwa Her, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 14/140,905

(22) Filed: Dec. 26, 2013

(65) Prior Publication Data

US 2014/0187291 A1 Jul. 3, 2014

(30) Foreign Application Priority Data

Jan. 3, 2013 (KR) .................. 10-2013-0000692

(51) Int. Cl.
*H04B 1/16* (2006.01)
*H04B 1/3816* (2015.01)
*H04W 52/02* (2009.01)

(52) U.S. Cl.
CPC ........... *H04B 1/3816* (2013.01); *H04W 52/028* (2013.01); *H04W 52/0261* (2013.01); *H04W 52/0209* (2013.01); *Y02B 60/50* (2013.01)

(58) Field of Classification Search
CPC ............... H04B 1/3816; H04W 88/02; H04W 52/0261; H04W 24/04; H04W 52/0209; Y02B 60/50
USPC ........ 455/522, 558, 574, 343.1, 343.2, 343.3, 455/343.4, 343.5; 370/311, 318; 713/340
See application file for complete search history.

(56) References Cited

U.S. PATENT DOCUMENTS 8,918,123 B2 * 12/2014 Seo .................. H04W 52/0251
455/458
2010/0285842 A1  11/2010 Venkateswarlu

FOREIGN PATENT DOCUMENTS

KR  10-2010-0121892 A  11/2010

* cited by examiner

*Primary Examiner* — Olumide T Ajibade Akonai
(74) *Attorney, Agent, or Firm* — Jefferson IP Law, LLP

(57) ABSTRACT

A mobile device is provided. The mobile device includes a battery, a Subscriber Identification Module (SIM) card, and a control unit. The mobile device transmits residual power information of the battery to a base station, and receives a SIM card polling cycle determined on the basis of the residual power information from the base station. Thereafter, the mobile device periodically determines the state of the SIM card in the received SIM card polling cycle.

13 Claims, 6 Drawing Sheets

MOBILE DEVICE HAVING SIM CARD, BASE STATION CONNECTED THERETO, AND BATTERY MANAGEMENT METHOD THEREOF

CROSS-REFERENCE TO RELATED APPLICATION(S)

This application claims the benefit under 35 U.S.C. §119 (a) of a Korean patent application filed on Jan. 3, 2013 in the Korean Intellectual Property Office and assigned Serial No. 10-2013-0000692, the entire disclosure of which is hereby incorporated by reference.

TECHNICAL FIELD

The present disclosure relates to a battery management in a mobile device having a Subscriber Identification Module (SIM) card. More particularly, the present disclosure relates to a mobile device and battery management method for determining a polling cycle of a SIM card on the basis of battery residual power and for checking a state of the SIM card in the determined polling cycle.

BACKGROUND

A mobile device has to be aware of whether a Subscriber Identification Module (SIM) card is in an inserted state or not (e.g., in relation to the mobile device), even after the mobile device is booted. In order to determine whether the SIM card is inserted in relation to the mobile device, 3GPP TS 31.101 prescribes that a mobile device should generate a polling signal at regular intervals to check the state of the SIM card.

Normally, in a sleep mode, a mobile device supplies no electric power or the minimum electric power to peripheral devices such as a display unit in order to reduce power consumption. In this state, a SIM card polling process requires a wake-up of both a baseband chip and a Power Management Unit (PMU). Requiring the baseband chip and the PMU to wake-up in order to perform the SIM card polling process causes unnecessary power consumption of about 100 mA for about one second. Therefore, a battery management technique to reduce such power consumption is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile device and battery management method for determining a polling cycle of a Subscriber Identification Module (SIM) card on the basis of battery residual power and checking the state of the SIM card in the determined polling cycle.

In accordance with an aspect of the present disclosure, a mobile device is provided. The mobile device includes a power supply unit including a battery, a wireless communication unit, a SIM card unit including a SIM card, and a control unit configured to transmit residual power information of the battery to a base station, to receive a SIM card polling cycle determined on the basis of the residual power information from the base station, and to determine the state of the SIM card in the received SIM card polling cycle.

In accordance with another aspect of the present disclosure, a base station connected to a mobile device including a battery and a SIM card is provided. The base station includes a wireless communication unit and a control unit configured to receive residual power information of the battery from the mobile device, to determine a SIM card polling cycle on the basis of the received residual power information, and to transmit the determined SIM card polling cycle to the mobile device.

In accordance with another aspect of the present disclosure, a battery management method for a mobile device including a battery and a SIM card is provided. The method includes transmitting residual power information of the battery to a base station, receiving a SIM card polling cycle determined on the basis of the residual power information from the base station, and determining the state of the SIM card in the received SIM card polling cycle.

In accordance with another aspect of the present disclosure, a method of operating a base station for managing battery power of a mobile device is provided. The method includes receiving residual power information of a battery installed in the mobile device, determining a Subscriber Identification Module (SIM) polling cycle based at least on the residual power information, and transmitting the determined SIM card polling cycle to the mobile device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a mobile device" includes reference to one or more of such mobile devices.

Figure 1:
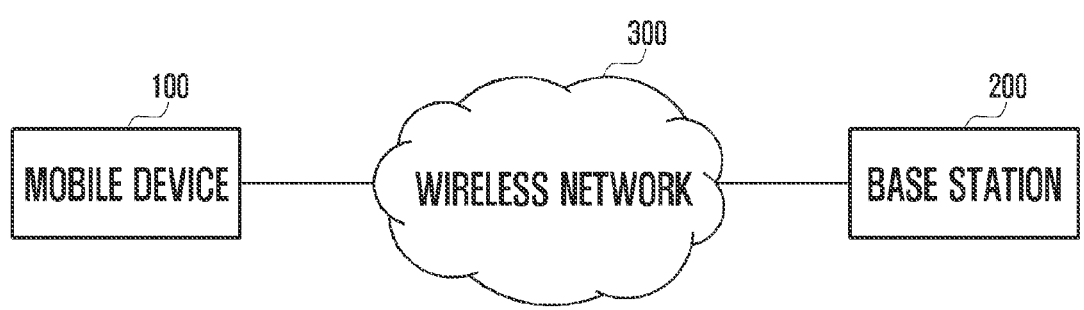
FIG. 1 is a schematic diagram illustrating a mobile communication system including a mobile device according to an embodiment of the present disclosure.

FIG. 1 is a schematic diagram illustrating a mobile communication system including a mobile device according to an embodiment of the present disclosure.

Referring to FIG. 1, the mobile device 100 may be connected to a base station 200 through a wireless communication network 300.

The mobile device 100 may transmit or receive data or the like to or from the base station 200 through the wireless communication network 300 and also perform a function such as a call connection, a message transmission or reception, or a broadcast reception.

According to various embodiments of the present disclosure, the mobile device 100 may include a cellular phone, a smart phone, a notebook, a laptop computer, a digital broadcast receiving device, a Personal Digital Assistant (PDA), Portable Multimedia Player (PMP), a navigation, a game console, a handheld e-book, a tablet Personal Computer (PC), a digital camera, a Global Positioning System (GPS) navigation, and the like.

The base station 200 may transmit or receive data or the like to or from the mobile device 100 through the wireless communication network 300 and also aid the mobile device 100 to perform a wire communication service.

The wireless communication network 300 may include a Local Area Network (LAN), a Metropolitan Area Network (MAN), a Wide Area Network (WAN), any type data communication network such as Internet, a broadcasting network, a telephone network, and any other radio network.

The mobile device 100 according to various embodiments of the present disclosure will be described in detail with reference to FIG. 2.

Figure 2:
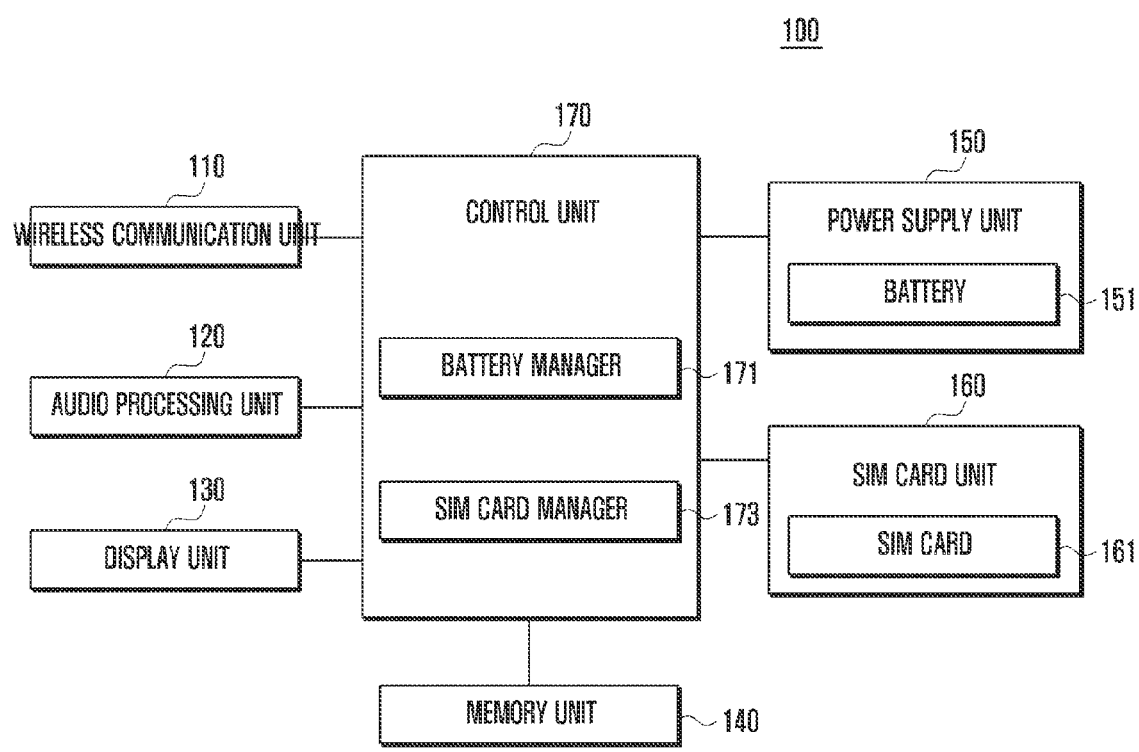
FIG. 2 is a block diagram illustrating an internal structure of a mobile device according to an embodiment of the present disclosure.

FIG. 2 is a block diagram illustrating an internal structure of a mobile device according to an embodiment of the present disclosure.

Referring to FIG. 2, the mobile device 100 may include a wireless communication unit 110, an audio processing unit 120, a display unit 130, a memory unit 140, a power supply unit 150, a SIM card unit 160, and a control unit 170.

The wireless communication unit 110 may perform transmission and reception of data for a wireless communication of the mobile device 100. Specifically, the wireless communication unit 110 may include a Radio Frequency (RF) transmitter that up-converts the frequency of an outgoing signal and amplifies the signal, an RF receiver that amplifies with low-noise an incoming signal and down-converts the frequency of the signal, and the like. Additionally, the wireless communication unit 110 may receive data from the base station 200 through a wireless channel and then output the received data to the control unit 170, or receive data from the control unit 170 and then transmit the received data to the base station 200 through a wireless channel.

The audio processing unit 120 may include a codec which may include a data codec for processing packet data and an audio codec for processing an audio signal such as voice. The audio processing unit 120 may convert a digital audio signal into an analog audio signal through the audio codec and then output the analog audio signal through a speaker, or receive an analog audio signal from a microphone and then convert the analog audio signal into a digital audio signal through the audio codec.

The display unit 130 may visually offer various types of information such as a menu, input data, function setting data, and the like to a user. In addition, the display unit 130 may output a booting screen, an idle screen, a menu screen, a call screen, and any other application screen.

The display unit 130 may be formed of Liquid Crystal Display (LCD), Organic Light Emitting Diode (OLED), Active Matrix OLED (AMOLED), a flexible display, a three-dimensional display, or any other equivalent.

The memory unit 140 may store a variety of programs and data required for the operation of the mobile device 100, and include a program region and a data region. The program region may store a specific program for controlling an overall operation of the mobile device 100, an operating system for booting the mobile device 100, various applications required for optional functions of the mobile device 100 such as a camera function, a sound reproduction function, and an image or video playback function, and the like. The data region may store various types of data, such as an image, a video, a phonebook, and audio, generated or received during operation of the mobile device 100.

The power supply unit 150 may include a battery 151. The power supply unit 150 may receive electric power from the battery 151 or any external power source and then supply the received power to respective elements of the mobile device 100 under the control of the control unit 170. The battery 151 may have a detachable form and be attached to the mobile device 100. Alternatively, the battery 151 may have an embedded form and be mounted in the mobile device 100.

The Subscriber Identification Module (SIM) card unit 160 may include a SIM card 161. Additionally, the SIM card unit 160 may register information of the mobile device 100 by performing a camping-on process to the base station 200 under the control of the control unit 170.

The control unit 170 may control the overall operation of the mobile device 100. Particularly, the control unit 170 may check (e.g., determine) the state of the SIM card 161 in a polling cycle which is determined on the basis of residual power information about the battery 151. In order to check the state of the SIM card 161, the control unit 170 may include a battery manager 171 and a SIM card manager 173.

The base station according to various embodiments of the present disclosure will be described in detail with reference to FIG. 3.

Figure 3:
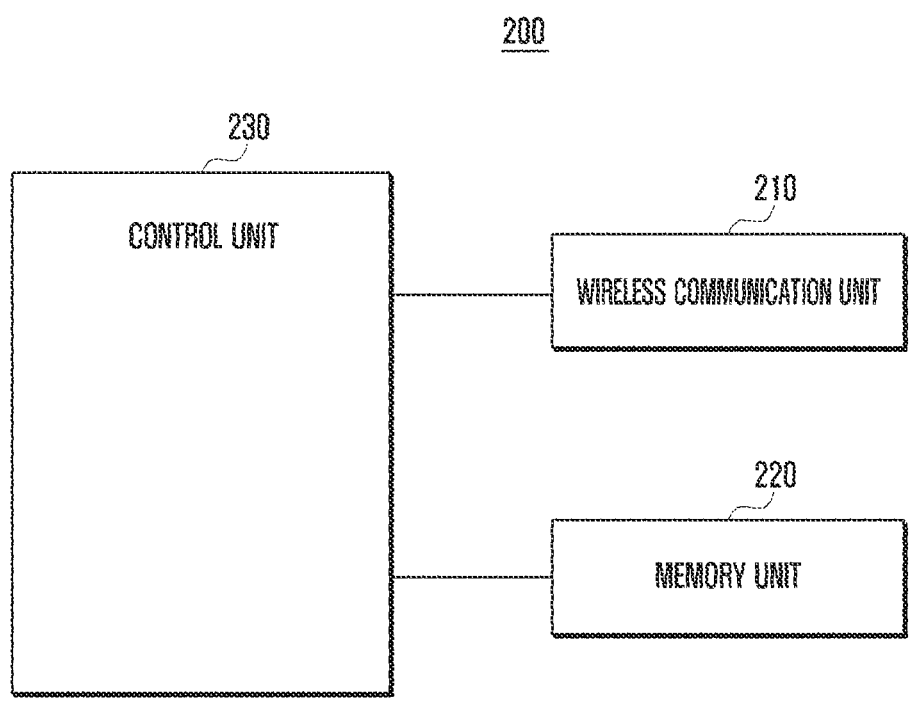
FIG. 3 is a block diagram illustrating an internal structure of a base station according to an embodiment of the present disclosure.

FIG. 3 is a block diagram illustrating an internal structure of a base station according to an embodiment of the present disclosure.

Referring to FIG. 3, the base station 200 may include a wireless communication unit 210, a memory unit 220, and a control unit 230.

The wireless communication unit 210 may perform transmission and reception of data for a wireless communication of the base station 200. Specifically, the wireless communication unit 210 may include an RF transmitter that up-converts the frequency of an outgoing signal and amplifies the signal, an RF receiver that amplifies with low-noise an incoming signal and down-converts the frequency of the signal, and the like. The wireless communication unit 210 may receive data from the mobile device 100 through a wireless channel and then output the received data to the control unit 230, or receive data from the control unit 230 and then transmit the received data to the mobile device 100 through a wireless channel.

The memory unit 220 may store a variety of programs and data required for the operation of the base station 200, and include a program region and a data region. The program region may store a specific program for controlling an overall operation of the base station 200, an operating system for booting the base station 200, and the like. The data region may store various types of data (e.g., information about the mobile device 100 connected to the base station 200) generated or received during operation of the base station 200, and the like.

The control unit 230 may control the overall operation of the base station 200. Particularly, the control unit 230 may determine a polling cycle of a SIM card on the basis of battery residual power information received from the mobile device 100, and transmit the determined SIM card polling cycle to the mobile device 100 through the wireless communication unit 210.

A battery management method according to various embodiments of the present disclosure will be described in detail with reference to FIGS. 2, 3 and 4.

Figure 4:
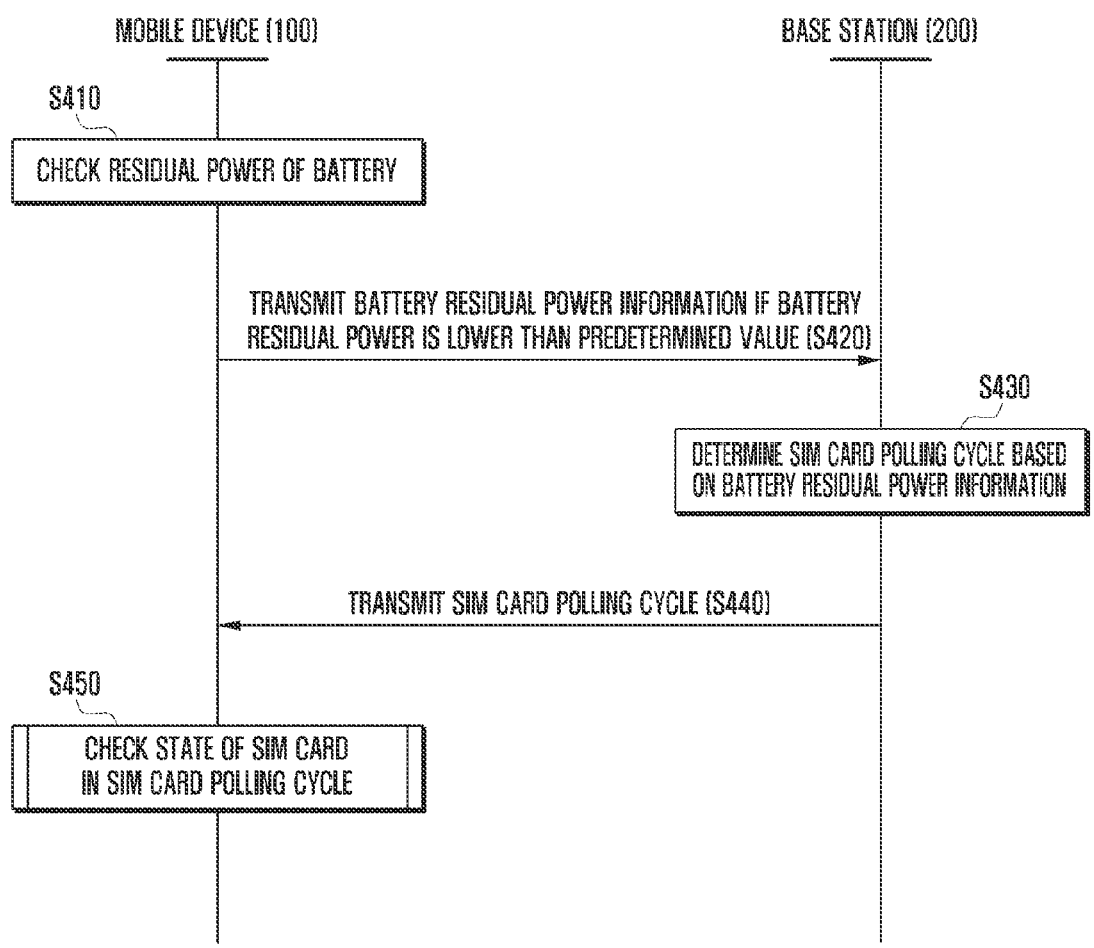
FIG. 4 is a flow diagram illustrating a battery management method according to an embodiment of the present disclosure.

FIG. 4 is a flow diagram illustrating a battery management method according to an embodiment of the present disclosure.

Referring to FIG. 4, at operation S410, the battery manager 171 of the mobile device 100 may periodically check residual power of the battery 151.

If the residual power of the battery is not lower than a predetermined value (e.g., a threshold residual power), then the battery manager 171 may continue to periodically check the residual power of the battery.

In contrast, if the residual power of the battery is lower than the predetermined value (e.g., the threshold residual power), then the battery manager 171 may proceed to operation S420 at which the battery manager 171 may transmit information about battery residual power to the base station 200 through the wireless communication unit 110. According to various embodiments of the present disclosure, battery residual power information may refer to remaining electric energy itself or the ratio of remaining electric energy to the maximum rechargeable electric energy. According to various embodiments of the present disclosure, battery residual power information may further include information about the maximum rechargeable electric energy.

According to various embodiments of the present disclosure, the battery manager 171 may transmit battery residual power information to the base station 200 through Unstructured Supplementary Services Data (USSD), Short Message Service (SMS), or the like. At this time, the battery manager 171 may operate on background without displaying any transmission information associated with battery residual power information.

Thereafter, at operation S430, the control unit 230 of the base station 200 may determine a SIM card polling cycle on the basis of the battery residual power information received from the mobile device 100. Particularly, the SIM card polling cycle will increase as battery residual power is low. According to various embodiments of the present disclosure, the control unit 230 may use any information about a mapping relation between a polling cycle and battery residual power, previously stored in the memory unit 220, to determine the SIM card polling cycle on the basis of the battery residual power information received from the mobile device 100.

Thereafter, at operation S440, the control unit 230 may transmit the determined SIM card polling cycle to the mobile device 100 through the wireless communication unit 210. At this time, the control unit 230 may use a Short Message Service Point-to-Point (SMS-PP) download function to send the SIM card polling cycle by means of SMS. The SMS-PP download function, which is one of Card Application Toolkit (CAT) functions defined in ETSI TS 102 223, refers to a function to transmit data to the SIM card 161 in the mobile device 100 through SMS.

Thereafter, at operation S450, the SIM card manager 173 may check (e.g., determine) the state of the SIM card 161 in the SIM card polling cycle received from the base station 200. For example, depending on the SIM card polling cycle determined on the basis of the residual power of the battery 151, the SIM card manager 173 may determine whether the SIM card 161 is inserted into the mobile device 100 (e.g., the SIM card manager 173 may check whether the SIM card 161 is in an inserted state or not).

A process of checking the state of the SIM card will be described in detail with reference to FIG. 5.

Figure 5:
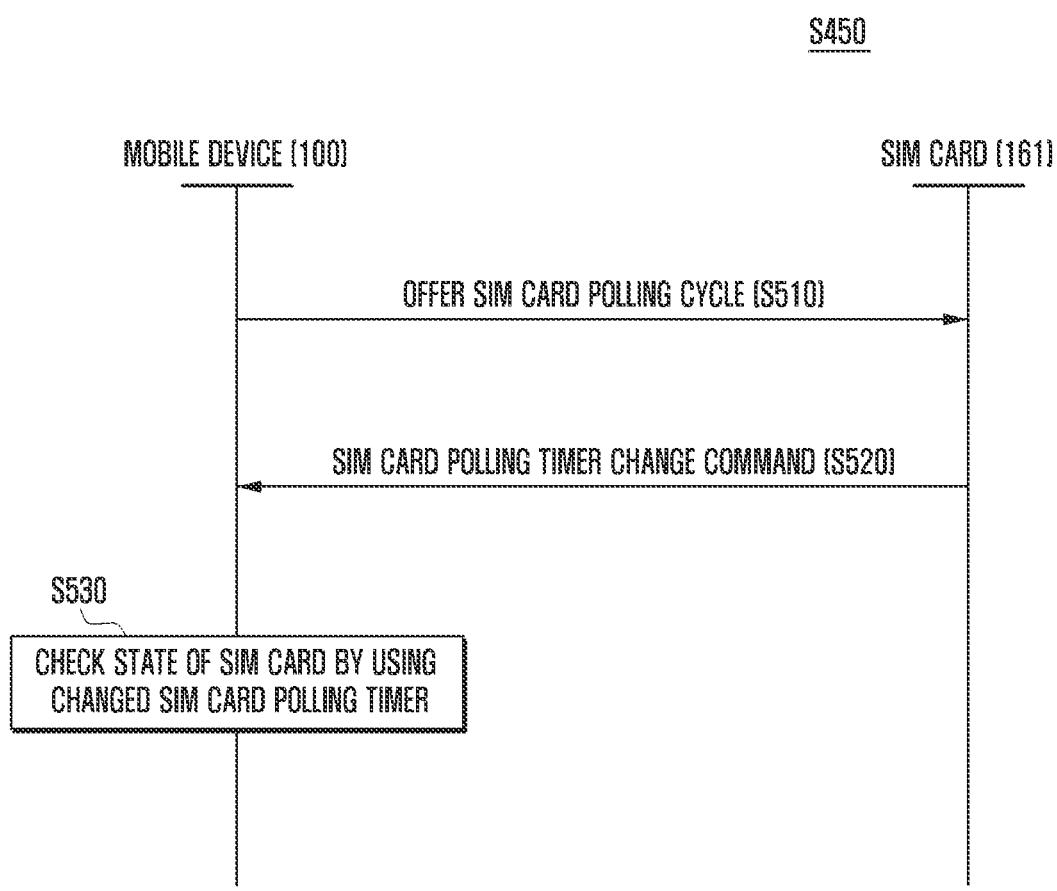
FIG. 5 is a flow diagram illustrating in detail a process of checking a state of a Subscriber Identification Module (SIM) card shown in FIG. 4 according to an embodiment of the present disclosure.

FIG. 5 is a flow diagram illustrating in detail a process of checking the state of a SIM card shown in FIG. 4 according to an embodiment of the present disclosure.

Referring to FIG. 5, at operation S510, the SIM card manager 173 of the mobile device 100 may offer, to the SIM card 161, the SIM card polling cycle received from the base station 200. For example, if the SIM card polling cycle is received through SMS, the SIM card manager 173 may provide the received SMS to the SIM card 161.

At operation S520, the SIM card 161 in the mobile device 100 may offer a SIM card polling timer change command to the SIM card manager 173 on the basis of the SIM card polling cycle received from the SIM card manager 173. At this time, the SIM card 161 may instruct the SIM card manager 173 to change a SIM card polling cycle through a "poll interval" command which is one of CAT functions.

Thereafter, at operation S530, the SIM card manager 173 may periodically check the state of the SIM card 161 by using a SIM card polling timer changed in response to the SIM card polling timer change command received from the SIM card 161.

A battery management method according to various embodiments will be described in detail with reference to FIG. 6. The following description will be focused on a difference between the various embodiments of the present disclosure described below and the various embodiments of the present disclosure described above.

Figure 6:
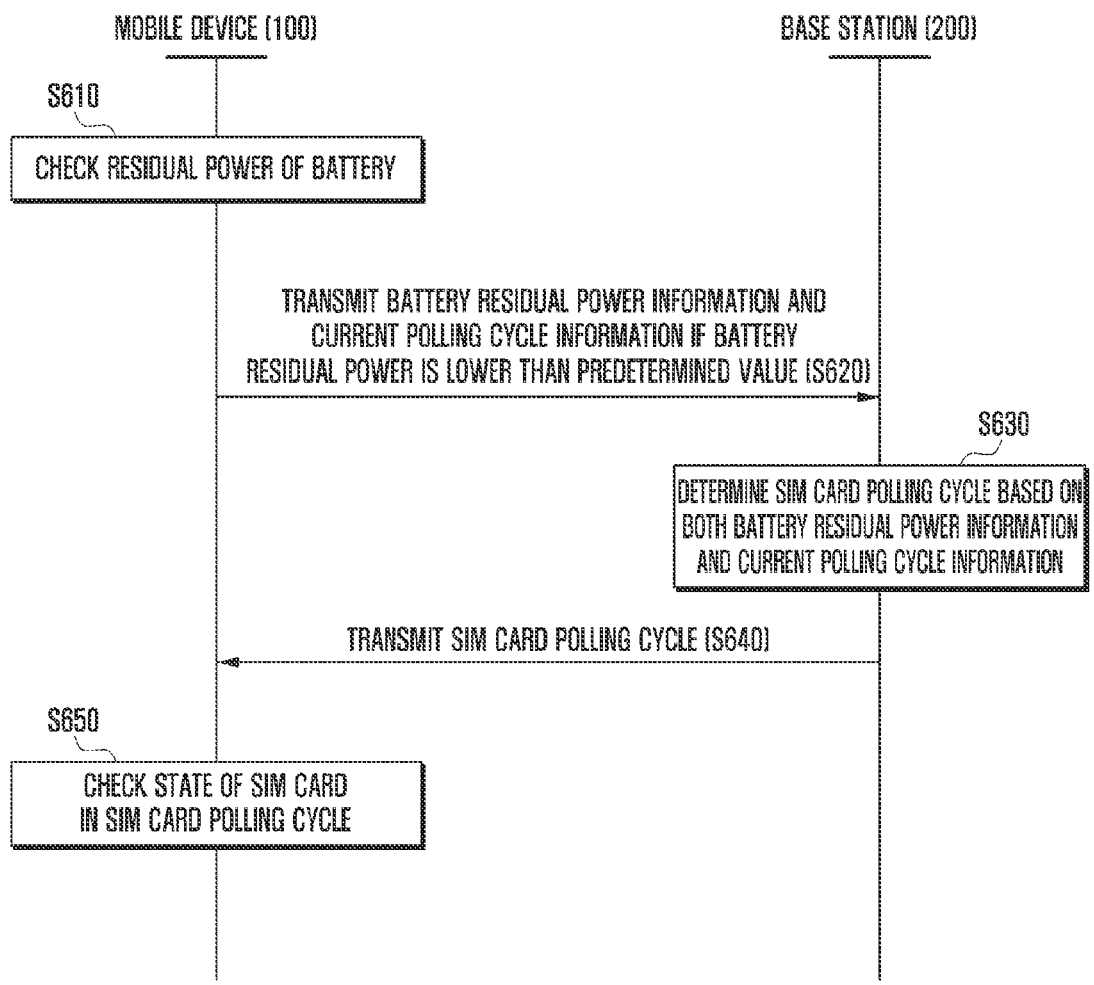
FIG. 6 is a flow diagram illustrating a battery management method according to an embodiment of the present disclosure.

FIG. 6 is a flow diagram illustrating a battery management method according to another embodiment of the present disclosure.

Referring to FIG. 6, at operation S610, the battery manager 171 of the mobile device 100 may periodically check residual power of the battery 151.

If the residual power of the battery is not lower than a predetermined value (e.g., a threshold residual value), then the battery manager 171 may continue to periodically check the residual power of the battery.

In contrast, if the residual power of the battery is lower than the predetermined value (e.g., the threshold residual power), then the battery manager 171 may proceed to operation S620 at which the battery manager 171 may transmit, to the base station 200, information about a current polling cycle of the SIM card 161 as well as information about battery residual power. According to various embodiments of the present disclosure, current polling cycle information refers to a SIM card polling cycle which is currently specified.

Thereafter, at operation S630, the control unit 230 of the base station 200 may determine a SIM card polling cycle on the basis of both the battery residual power information and the current polling cycle information received from the mobile device 100. For example, if the first mobile device has battery residual power information '20%' and current polling cycle information '2 seconds' and if the second mobile device has battery residual power information '20%' and current polling cycle information '5 seconds', the control unit 230 may appoint '4 seconds' and '10 seconds' as SIM card polling cycles of the first and second mobile devices, respectively, on the basis of both the battery residual power information and the current polling cycle information received from the respective mobile devices.

Thereafter, at operation S640, the control unit 230 may transmit the determined SIM card polling cycle to the mobile device 100 through the wireless communication unit 210.

Thereafter, at operation S650, the SIM card manager 173 of the mobile device 100 may check the state of the SIM card 161 in the SIM card polling cycle received from the base station 200.

As discussed above, a SIM card polling cycle is changed depending on battery residual power. Therefore, because the number of a wake-up of CPU and the like decreases, power consumption of the mobile device is reduced and battery duration is increased.

Although in the above discussion the control unit 170, the battery manager 171 and the SIM card manager 173 are formed of separate blocks which perform different functions, such a configuration is merely exemplary and is not to be considered as a limitation. For example, according to various embodiments of the present disclosure, the control unit 170 may absorb parts or all of functions performed by the battery manager 171 and the SIM card manager 173.

Moreover, although in the above discussion the base station 200 determines a SIM card polling cycle on the basis of battery residual power information received from the mobile device 100, such a configuration and/or method is merely exemplary and is not to be considered as a limitation. For example, according to various embodiments of the present disclosure, a SIM card polling cycle may be determined by the mobile device 100, especially by the control unit 170 or by the SIM card unit 160.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile device comprising:
   a power supply unit including a battery;
   a wireless communication unit;
   a Subscriber Identification Module (SIM) card unit including a SIM card; and
   a control unit configured to transmit residual power information of the battery to a base station, to receive a SIM card polling cycle determined on the basis of the residual power information from the base station, and to determine the state of the SIM card in the received SIM card polling cycle.

2. The mobile device of claim 1, wherein the control unit is further configured to offer the received SIM card polling cycle to the SIM card, and to periodically determine the state of the SIM card by using a SIM card polling timer changed in response to a command received from the SIM card.

3. The mobile device of claim 1, wherein the control unit is further configured to transmit current polling cycle information of the SIM card as well as the residual power information of the battery to the base station, and to receive the SIM card polling cycle determined on the basis of both the residual power information and the current polling cycle information from the base station.

4. A base station connected to a mobile device including a battery and a Subscriber Identification Module (SIM) card, the base station comprising:
   a wireless communication unit; and
   a control unit configured to receive residual power information of the battery from the mobile device, to determine a SIM card polling cycle on the basis of the received residual power information, and to transmit the determined SIM card polling cycle to the mobile device.

5. The base station of claim 4, wherein the control unit is further configured to receive current polling cycle information of the SIM card as well as the residual power information of the battery from the mobile device, and to determine the SIM card polling cycle on the basis of both the residual power information and the current polling cycle information.

6. A battery management method for a mobile device including a battery and a Subscriber Identification Module (SIM) card, the method comprising:
   transmitting residual power information of the battery to a base station;
   receiving a SIM card polling cycle determined on the basis of the residual power information from the base station; and
   determining the state of the SIM card in the received SIM card polling cycle.

7. The method of claim 6, wherein the determining of the state of the SIM card includes:
  offering the received SIM card polling cycle to the SIM card; and
  periodically determining the state of the SIM card by using a SIM card polling timer changed in response to a command received from the SIM card.

8. The method of claim 6, wherein the transmitting of the residual power information includes transmitting current polling cycle information of the SIM card as well as the residual power information of the battery to the base station, and
  wherein the receiving of the SIM card polling cycle includes receiving the SIM card polling cycle determined on the basis of both the residual power information and the current polling cycle information from the base station.

9. A non-transitory computer-readable storage medium storing instructions that, when executed, cause at least one processor to perform the method of claim 6.

10. A method of operating a base station for managing battery power of a mobile device, the method comprising:
  receiving residual power information of a battery installed in the mobile device;
  determining a Subscriber Identification Module (SIM) polling cycle based at least on the residual power information; and
  transmitting the determined SIM card polling cycle to the mobile device.

11. The method of claim 10, further comprising:
  receiving current polling cycle information from the mobile device.

12. The method of claim 11, wherein the determining of the SIM polling cycle includes determining the SIM polling cycle based on the residual power information and the current polling cycle information.

13. A non-transitory computer-readable storage medium storing instructions that, when executed, cause at least one processor to perform the method of claim 10.

* * * * *